(12) United States Patent
Iida et al.

(10) Patent No.: US 11,766,994 B2
(45) Date of Patent: Sep. 26, 2023

(54) DEFROSTER STRUCTURE

(71) Applicant: Toyota Jidosha Kabushiki Kaisha, Toyota (JP)

(72) Inventors: Keiko Iida, Nagoya (JP); Motomi Hirano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 17/103,168

(22) Filed: Nov. 24, 2020

(65) Prior Publication Data

US 2021/0162951 A1 Jun. 3, 2021

(30) Foreign Application Priority Data

Nov. 29, 2019 (JP) ................................. 2019-217327

(51) Int. Cl.

| | |
|---|---|
| *B60S 1/02* | (2006.01) |
| *B60H 1/34* | (2006.01) |
| *B60H 1/24* | (2006.01) |
| *B60S 1/54* | (2006.01) |

(52) U.S. Cl.
CPC .............. *B60S 1/023* (2013.01); *B60H 1/242* (2013.01); *B60H 1/3407* (2013.01); *B60S 1/54* (2013.01)

(58) Field of Classification Search
CPC . B60S 1/023; B60S 1/54; B60H 1/242; B60H 1/3407
USPC ........................................................ 454/150
See application file for complete search history.

(56) References Cited

U.S. PATENT DOCUMENTS

| | | | |
|---|---|---|---|
| 2010/0035533 A1* | 2/2010 | Dubief ................. | B60H 1/0055 454/127 |
| 2016/0075310 A1 | 3/2016 | Terai et al. | |
| 2016/0288625 A1* | 10/2016 | Uhlenbusch ............ | F24F 13/14 |
| 2018/0251012 A1* | 9/2018 | Sano ..................... | B60H 1/3407 |
| 2019/0168566 A1* | 6/2019 | Motomura ........... | B60H 1/00871 |

FOREIGN PATENT DOCUMENTS

| | | | | |
|---|---|---|---|---|
| CN | 204340977 U | | 5/2015 | |
| CN | 207875587 U | | 9/2018 | |
| DE | 29706506 U1 | * | 5/1997 | ............... B60H 1/26 |
| DE | 102008011138 A1 | | 8/2009 | |
| DE | 102008011138 A1 | * | 8/2009 | ........... B60H 1/3407 |
| EP | 0566474 A1 | | 10/1993 | |
| EP | 0566474 B2 | * | 11/2000 | ............... B60H 1/54 |

(Continued)

OTHER PUBLICATIONS

JP-2016088195-A—machine translation (Year: 2022).*
JP-2018002075-A—machine translation (Year: 2022).*
DE-29706506-U1—machine translation (Year: 2022).*

*Primary Examiner* — Allen R. B. Schult
(74) *Attorney, Agent, or Firm* — Dinsmore & Shohl LLP (57) ABSTRACT

In a defroster structure, a first guide member is provided further toward a vehicle front side than a front-rear partitioning wall and at a vehicle transverse direction outer side, at an interior of a blow-out port. A second guide member is provided further toward a vehicle rear side than the front-rear partitioning wall and at the vehicle transverse direction outer side, at the interior of the blow-out port. The first guide member and the second guide member respectively extend toward the vehicle transverse direction outer side from a vehicle lower side toward a vehicle upper side.

5 Claims, 8 Drawing Sheets

(56) References Cited

FOREIGN PATENT DOCUMENTS

| FR | 2746695 A1 | * | 10/1997 | ........... B29C 33/505 |
|----|---|---|---|---|
| FR | 0566474 B2 | * | 11/2000 | ............. B60H 1/242 |
| JP | H06-219151 A | | 8/1994 | |
| JP | H11-170859 A | | 6/1999 | |
| JP | 2010-195301 A | | 9/2010 | |
| JP | 2010195301 A | * | 9/2010 | ............... B60H 1/26 |
| JP | 2015-003605 A | | 1/2015 | |
| JP | 2016-088196 A | | 5/2016 | |
| JP | 2016088195 A | * | 5/2016 | ......... B60H 1/00035 |
| JP | 2017-222273 A | | 12/2017 | |
| JP | 2018002075 A | * | 1/2018 | ............... B60H 1/34 |
| JP | 2019-099096 A | | 6/2019 | |
| JP | 6542719 B2 | | 7/2019 | |
| KR | 900000518 B1 | * | 1/1990 | ............. B60H 1/242 |
| KR | 900000518 B1 | * | 1/1990 | ............... B60H 1/54 |
| KR | 100220623 B1 | * | 9/1999 | ........... B60H 1/3407 |

* cited by examiner

DEFROSTER STRUCTURE

CROSS-REFERENCE TO RELATED APPLICATION

This application is based upon and claims the benefit of priority of the prior Japanese Patent Application No. 2019-217327, filed on Nov. 29, 2019, the entire contents of which are incorporated herein by reference.

FIELD

The embodiments discussed herein are related to a defroster structure.

Japanese Patent Application Laid-Open (JP-A) No. 2015-3605 discloses an invention related to a front defroster nozzle device. In order to blow air-conditioned air from an air conditioner out toward the windshield glass, this front defroster nozzle device has a front blow-out port that is provided at the vehicle front side of the top surface of the instrument panel, and a rear blow-out port that is provided at the vehicle rear side of the front blow-out port. The front blow-out port and the rear blow-out port blow air out in different directions. Due thereto, even in a case in which the vehicle transverse direction dimension of the defroster nozzle is limited due to another device, such as a head-up display device or the like, being provided at the top surface of the instrument panel, the function of removing fog that is on the windshield glass is ensured.

However, in the case of the structure disclosed in JP-A No. 2015-3605, the front blow-out port and the rear blow-out port are adjacent in the vehicle longitudinal direction. Therefore, at the portion where the air-conditioned airs, which are blown out in different directions from the respective blow-out ports, contact one another, there is the possibility that friction loss will arise and pressure loss will arise. In this case, by an amount corresponding to the amount of the pressure loss that arises (i.e., due to the pressure loss arising), it becomes difficult to for the air-conditioned air to reach far, and there is the possibility that fog in the vicinities of the vehicle transverse direction outer side portions of the windshield glass, which are at positions that are far from the front blow-out port and the rear blow-out port, will not be able to be removed efficiently. There is room for improvement over the above-described related art (i.e., the technique disclosed in the above-described publication) with regard to this point.

SUMMARY

In view of the above-described circumstances, an object of the present disclosure is to provide a defroster structure that can efficiently remove fog that is on a windshield glass.

A defroster structure relating to a first aspect includes: a blow-out port that is provided at a position that substantially faces a windshield glass of a vehicle, at a substantially central portion in a vehicle transverse direction of an instrument panel positioned at a front portion of a passenger compartment of a vehicle, and that blows out air-conditioned air that is from an air conditioner; a front-rear partitioning wall that is provided at an interior of the blow-out port, that extends in the vehicle transverse direction, and that partitions at least a portion of the interior of the blow-out port in a vehicle longitudinal direction; a first guide member that is provided further toward a vehicle front side than the front-rear partitioning wall, at a vehicle transverse direction outer side at the interior of the blow-out port, and that is inclined toward a vehicle transverse direction outer side while heading from a vehicle lower side toward a vehicle upper side; and a second guide member that is provided further toward a vehicle rear side than the front-rear partitioning wall, at the vehicle transverse direction outer side at the interior of the blow-out port, that is inclined toward a vehicle transverse direction outer side while heading from the vehicle lower side toward the vehicle upper side, and that has an angle of inclination with respect to a vertical direction which is the same as that of the first guide member.

In accordance with the defroster structure relating to the first aspect, the blow-out port is formed at a position that substantially faces the windshield glass, and at a substantially central portion in the vehicle transverse direction, at the instrument panel that is positioned at the front portion of the passenger compartment. The blow-out port blows out air-conditioned air that is from the air conditioner. The front-rear partitioning wall, the first guide member and the second guide member are provided at the interior of the blow-out port. Among these, the front-rear partitioning wall is provided at the interior of the blow-out port and extends along the vehicle transverse direction, and partitions at least a portion of the interior of the blow-out port in the vehicle longitudinal direction. Accordingly, adjustment of the flow of the air-conditioned air that flows through the interior of the blow-out port can be carried out by the front-rear partitioning wall.

The first guide member is provided further toward the vehicle front side than the front-rear partitioning wall and at a vehicle transverse direction outer side, at the interior of the blow-out port. On the other hand, the second guide member is provided further toward the vehicle rear side than the front-rear partitioning wall and at the vehicle transverse direction outer side, at the interior of the blow-out port. The first guide member and the second guide member respectively are inclined toward the vehicle transverse direction outer side while heading from the vehicle lower side toward the vehicle upper side, and the angles of inclination thereof with respect to the vertical direction are the same. Accordingly, the air-conditioned air, whose flow is adjusted by the first guide member of the blow-out port, and the air-conditioned air, whose flow is adjusted by the second guide member, are both blown out from the blow-out port toward the vehicle transverse direction outer side in the same direction. Therefore, at the portion where the air-conditioned air whose flow is adjusted by the first guide member and the air-conditioned air whose flow is adjusted by the second guide member contact one another, friction loss that arises due to the blow-out directions being different can be suppressed. Namely, because pressure loss of the air-conditioned air is reduced, the air-conditioned air can be blown out efficiently toward a vicinity of the vehicle transverse direction outer side portion of the windshield glass that is at a position that is relatively far from the blow-out port.

In a defroster structure relating to a second aspect, in the defroster structure of the first aspect, the second guide member is provided further toward the vehicle rear side than the first guide member.

In a defroster structure relating to a third aspect, in the defroster structure of the second aspect, the second guide member is provided further toward the vehicle rear side than the first guide member, with the front-rear partitioning wall located between the second guide member and the first guide member.

In a defroster structure relating to a fourth aspect, in the defroster structure of the second aspect, the second guide member is joined to the first guide member in the vehicle longitudinal direction.

In a defroster structure relating to a fifth aspect, in the defroster structure of the first aspect, first guide members are provided further toward a vehicle front side than the front-rear partitioning wall, at both respective vehicle transverse direction outer sides of the interior of the blow-out port, and second guide members are provided further toward a vehicle rear side than the front-rear partitioning wall, at both respective vehicle transverse direction outer sides of the interior of the blow-out port.

In a defroster structure relating to a sixth aspect, in the defroster structure of the first aspect, a left-right partitioning wall is provided at the interior of the blow-out port, the left-right partitioning wall is provided at a vehicle transverse direction inner side with respect to a vehicle transverse direction outer side edge portion of the blow-out port, and extends along the vehicle longitudinal direction between vehicle longitudinal direction edge portions of the blow-out port, the front-rear partitioning wall is provided at a vehicle transverse direction inner side of the left-right partitioning wall, and a vehicle transverse direction end portion of the front-rear partitioning wall is connected to the left-right partitioning wall, and the first guide member and the second guide member are disposed at a vehicle transverse direction outer side with respect to the left-right partitioning wall.

In a defroster structure relating to a seventh aspect, in the defroster structure of the fifth aspect, left-right partitioning walls are provided at the interior of the blow-out port, a pair of the left-right partitioning walls are provided at vehicle transverse direction inner sides with respect to a pair of vehicle transverse direction outer side edge portions of the blow-out port, and extend along the vehicle longitudinal direction between a pair of vehicle longitudinal direction edge portions of the blow-out port, the front-rear partitioning wall is provided between the pair of left-right partitioning walls, and both respective vehicle transverse direction end portions of the front-rear partitioning wall are connected to the left-right partitioning walls, and the first guide members and the second guide members are disposed at vehicle transverse direction outer sides with respect to the left-right partitioning walls.

In a defroster structure relating to an eighth aspect, in the defroster structure of the first aspect, a plurality of crosspiece portions, which are formed so as to be elongated along substantially the vehicle longitudinal direction and are lined up at an interval in substantially the vehicle transverse direction, are provided at a passenger compartment side opening of the blow-out port, and cross-sectional shapes, which are orthogonal to length directions, of the crosspiece portions are substantially rectangular, and a crosspiece portion that is positioned in a vicinity of the first guide member and the second guide member, is inclined such that, as seen in a vehicle front view, an angle, with respect to a vertical direction, of a long side of the cross-sectional shape is substantially the same as angles of inclination, with respect to the vertical direction, of the first guide member and the second guide member that are in the vicinity.

In a defroster structure relating to a ninth aspect, in the defroster structure of the first aspect, a plurality of crosspiece portions, which are formed so as to be elongated along substantially the vehicle longitudinal direction and are lined up at an interval in substantially the vehicle transverse direction, are provided at a passenger compartment side opening of the blow-out port, and a cross-sectional shape, which is orthogonal to a length direction, of at least a crosspiece portion that is positioned in a vicinity of the first guide member and the second guide member is a shape at which at least a vehicle lower side has a curved portion.

The defroster structure relating to the present disclosure can efficiently remove fog on the windshield glass.

DESCRIPTION OF EMBODIMENTS

First Embodiment

A defroster structure 10 relating to a first embodiment is described hereinafter on the basis of FIG. 1 through FIG. 6. Note that arrow FR, arrow UP and arrow OUT the are shown appropriately in the respective drawings indicate the forward direction (e.g., the advancing direction), the upward direction, and an outer side in the vehicle transverse direction, respectively, of a vehicle. Hereinafter, when explanation is given by using merely longitudinal, left-right and vertical directions, they refer to the longitudinal of the vehicle longitudinal direction, the left and right of the vehicle left-right direction (the vehicle transverse direction), and upward and downward in the vehicle vertical direction, unless otherwise specified.

(Overall Structure)

Figure 1:
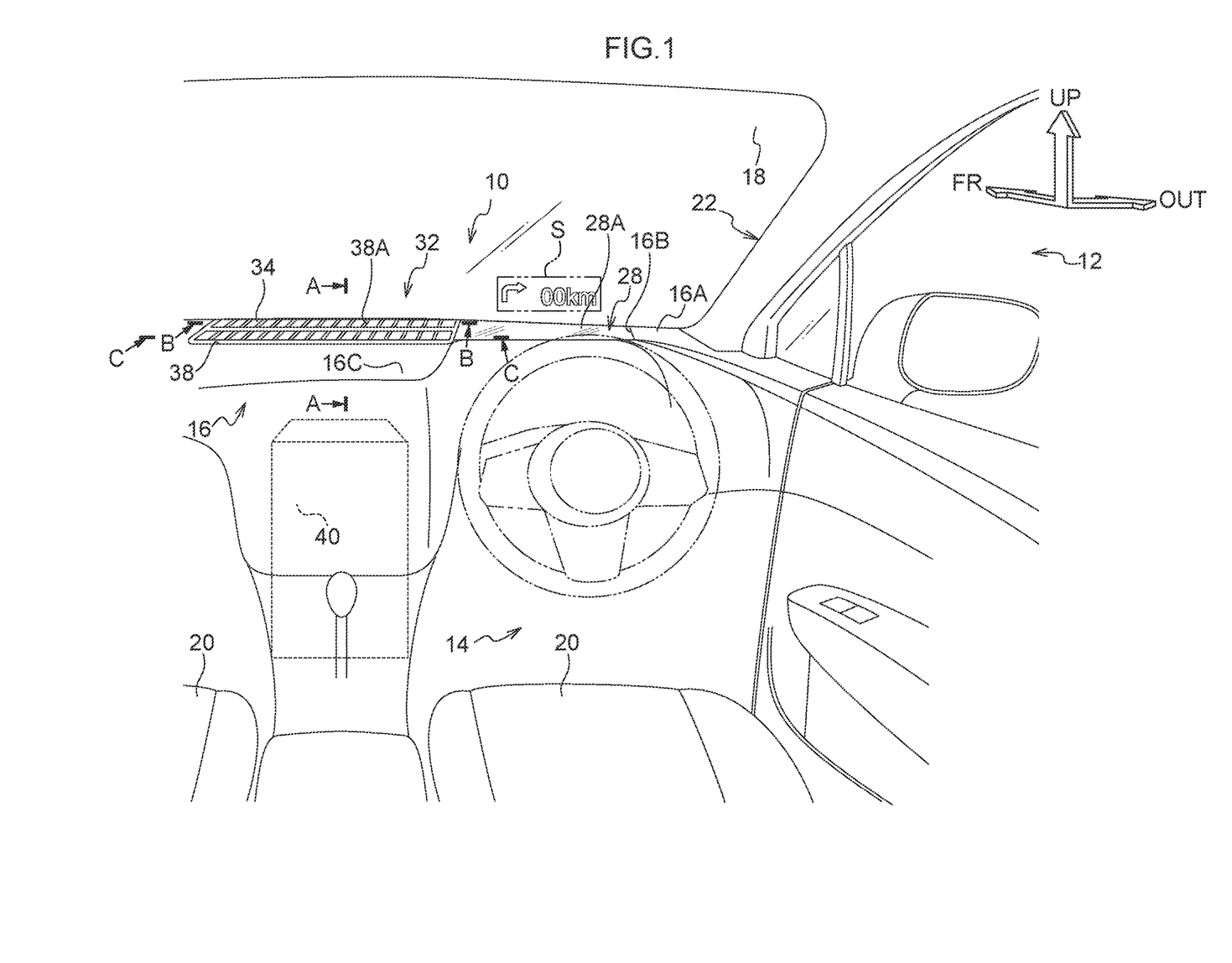
FIG. 1 is a schematic perspective view in which an instrument panel, which has a defroster structure relating to a first embodiment, is seen from a vehicle rear side.

As shown in FIG. 1, an instrument panel 16 is provided at the front portion of interior of a passenger compartment 14 of a vehicle 12. The instrument panel 16 is disposed at the upper portion side of the vehicle rear side of a dash panel (not illustrated) that separates (i.e., partitions) the passenger compartment 14 and the vehicle front portion. The lower end portion of the dash panel is connected to the front end portion of an unillustrated floor panel, and the floor panel structures the lower surface of the passenger compartment 14. An unillustrated cowl is connected to the upper end portion of the dash panel. The cowl supports the lower end portion of a windshield glass 18. The windshield glass 18 structures the front surface of the upper portion side of the passenger compartment 14. The lower end portion side of the windshield glass 18 is disposed at a front end portion 16A side of the instrument panel 16.

Vehicle seats 20 that are the front seats of the vehicle are provided at the vehicle rear side of the instrument panel 16. In the first embodiment, the vehicle seat 20 at the left side of the front portion of the passenger compartment 14 is the front passenger's seat, and the vehicle seat 20 at the right side of the front portion of the passenger compartment 14 is the driver's seat.

(Instrument Panel)

The instrument panel 16 is structured as an interior panel member that is made of resin and extends along the vehicle transverse direction. An instrument panel reinforcement (not illustrated) that is elongated along the vehicle transverse direction is disposed at the upper portion of the inner portion (e.g., the vehicle front side) of the instrument panel 16. The instrument panel 16 is supported by the instrument panel reinforcement at a plurality of places. Note that the instrument panel reinforcement is, as an example, a pipe member that is made of metal, and the length direction both end portions thereof are fixed to the vehicle lower sides of a pair of front pillars 22 (e.g., left and right frame portions, the left side front pillar being omitted from FIG. 1) that are provided upright at the left and right vehicle body side portions.

(Head-Up Display Device)

A head-up display device 28 is provided at the interior of the instrument panel 16 at the driver's seat side. Concretely, the head-up display device 28 is provided at the interior of an opening portion 16B that is formed in the front end portion 16A at a top surface 16C at the driver's seat side of the instrument panel 16. The opening portion 16B opens toward the vehicle upper side. A display, which emits an emitted light image that serves as emitted light for information display and which is connected to a display control device so as to be able to communicate therewith, and a reflecting mirror, which reflects the emitted light image from the display, are provided within the head-up display device 28 (neither the display nor the reflecting mirror is shown in the drawings). The display is disposed at the vehicle longitudinal direction rear portion of the interior of the head-up display device 28, and emits the emitted light image toward the vehicle front side. The display has a light source that is formed from light-emitting diodes or the like.

The reflecting mirror is disposed at the vehicle longitudinal direction front side, which faces the display, of the interior of the head-up display device 28. As an example, the reflecting mirror is a concave mirror that is disposed so as to be concave toward the display. As seen in a vehicle side view, the reflecting mirror is disposed at an incline such that the upper portion thereof is at the vehicle front side and the lower portion thereof is at the vehicle rear side. Due thereto, the emitted light image from the display is, at the reflecting mirror, reflected toward an obliquely vehicle upper rear side, and the reflected image is enlarged.

The emitted light image that is reflected at the reflecting mirror is projected onto the windshield glass 18 via a transparent cover member 28A that is mounted to the opening portion 16B formed in the top surface 16C of the instrument panel 16. Due thereto, the emitted light image from the display is guided to the reflecting mirror, and the emitted light image that is reflected and enlarged by the reflecting mirror is projected into projection area S, in which information is displayed and that is demarcated by the two-dot chain line shown in FIG. 1, of the windshield glass 18. Note that, as an example, the head-up display device 28 displays one or more of the traveling speed of the vehicle 12, a display that guides the vehicle 12 to the destination, the speed limit of the road, and the like, in the projection area S of the windshield glass 18.

(Defroster)

A defroster 32 is provided at the substantially central portion in the vehicle transverse direction of the instrument panel 16. The defroster 32 has a blow-out port 34 and a duct 36 (see FIG. 3). The blow-out port 34 is formed so as to open toward the vehicle upper side, in the front end portion 16A of the top surface 16C of the substantially central portion in the vehicle transverse direction of the instrument panel 16. A garnish 38 that has a plurality of crosspiece portions 38A is mounted from the vehicle upper side to the blow-out port 34 at a passenger compartment side opening that is described later.

Figure 3:
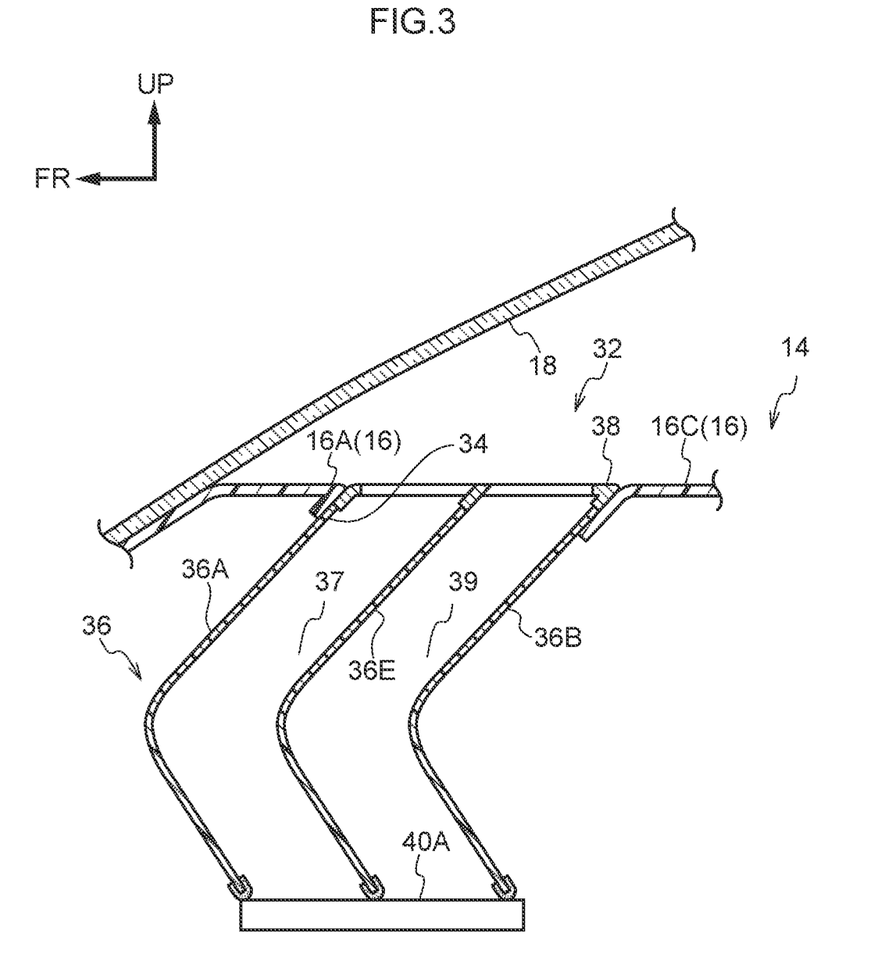
FIG. 3 is an enlarged sectional view that is cut along line A-A of FIG. 1 and shows a state in which the garnish is removed.

As shown in FIG. 3, the duct 36 extends toward the vehicle lower side from the blow-out port 34, and is formed in a hollow shape and in a shape in which, when seen in a vehicle side view, the substantially central portion thereof in the vehicle vertical direction is curved toward the vehicle front side. Concretely, the duct 36 has a front wall portion 36A and a rear wall portion 36B that are disposed so as to face one another in the vehicle longitudinal direction. Moreover, the duct 36 has a pair of side wall portions 36C, 36D that face one another and connect the vehicle transverse direction end portions of the front wall portion 36A and the rear wall portion 36B together (see FIG. 4). The pair of side wall portions 36C, 36D are inclined (i.e., tilted) in directions of moving apart from one another while heading toward the vehicle upper side. The air blowing path of the duct 36 is structured by the side wall portions 36C, 36D, the front wall portion 36A and the rear wall portion 36B. Due thereto, at the front wall portion 36A and the rear wall portion 36B of the duct 36, the regions thereof from the substantially central portions in the vehicle vertical direction toward the vehicle upper side are inclined toward the vehicle rear side while heading toward the vehicle upper side, and the regions thereof from the substantially central portions in the vehicle vertical direction toward the vehicle lower side are inclined toward the vehicle rear side while heading toward the vehicle lower side.

A front-rear partitioning wall 36E is provided at the duct 36 at the substantially central portion thereof in the vehicle longitudinal direction. The front-rear partitioning wall 36E extends along the vehicle transverse direction, with the plate thickness direction thereof being the substantially vehicle longitudinal direction. Namely, the front-rear partitioning wall 36E is a structure that partitions the duct 36 into a front portion and a rear portion in the vehicle longitudinal direction. The unillustrated vehicle transverse direction end portions of the front-rear partitioning wall 36E are connected to the side wall portion 36C and the side wall portion 36D, respectively. As seen in a vehicle side view, the front-rear partitioning wall 36E is formed in a shape that is similar to those of the front wall portion 36A and the rear wall portion 36B. Namely, the front-rear partitioning wall 36E is formed in a shape in which, as seen in a vehicle side view, the substantially central portion thereof in the vehicle vertical direction is bent toward the vehicle front side, and the front-rear partitioning wall 36E is disposed parallel to the front wall portion 36A and the rear wall portion 36B. Due thereto, there is a structure in which the interior of the duct 36 is divided into a front side flow path 37 that is at the vehicle front side and a rear side flow path 39 that is at the vehicle rear side.

The duct 36 is connected to an air conditioner 40 that is shown in FIG. 1. As an example, the air conditioner 40 is disposed at the vehicle front side and lower side of the instrument panel 16 of the vehicle 12. The air conditioner 40 has an unillustrated blower. An air flow is formed due to the blower being operated. For example, an evaporator, a heater core (neither of which is illustrated) and the like are provided at the downstream side of the airflow with respect to the blower, such that conditioned air, in which the temperature, the humidity and the like of the airflow have been adjusted, is generated. This airflow passes-through the interior of the duct 36, which is connected to a defroster mode exit 40A of the air conditioner 40 shown in FIG. 3, and is blown out from the blow-out port 34 to the exterior as air-conditioned air. Note that the air-conditioned air from the air conditioner 40 flows through the front side flow path 37 and the rear side flow path 39, respectively, at the interior of the duct 36. Further, in addition to the blow-out port 34, air conditioning ducts, which are connected to unillustrated blow-out ports that are provided at various positions within the passenger compartment 14, also are connected to the air conditioner 40. The air conditioner 40 is connected to an unillustrated control device so as to be able to communicate therewith. The air conditioner 40 can blow air-conditioned air of different temperatures and volumes to each of the blow-out port 34 and the other blow-out ports in accordance with instructions from the control device.

(First Guide Members)

Figure 2:
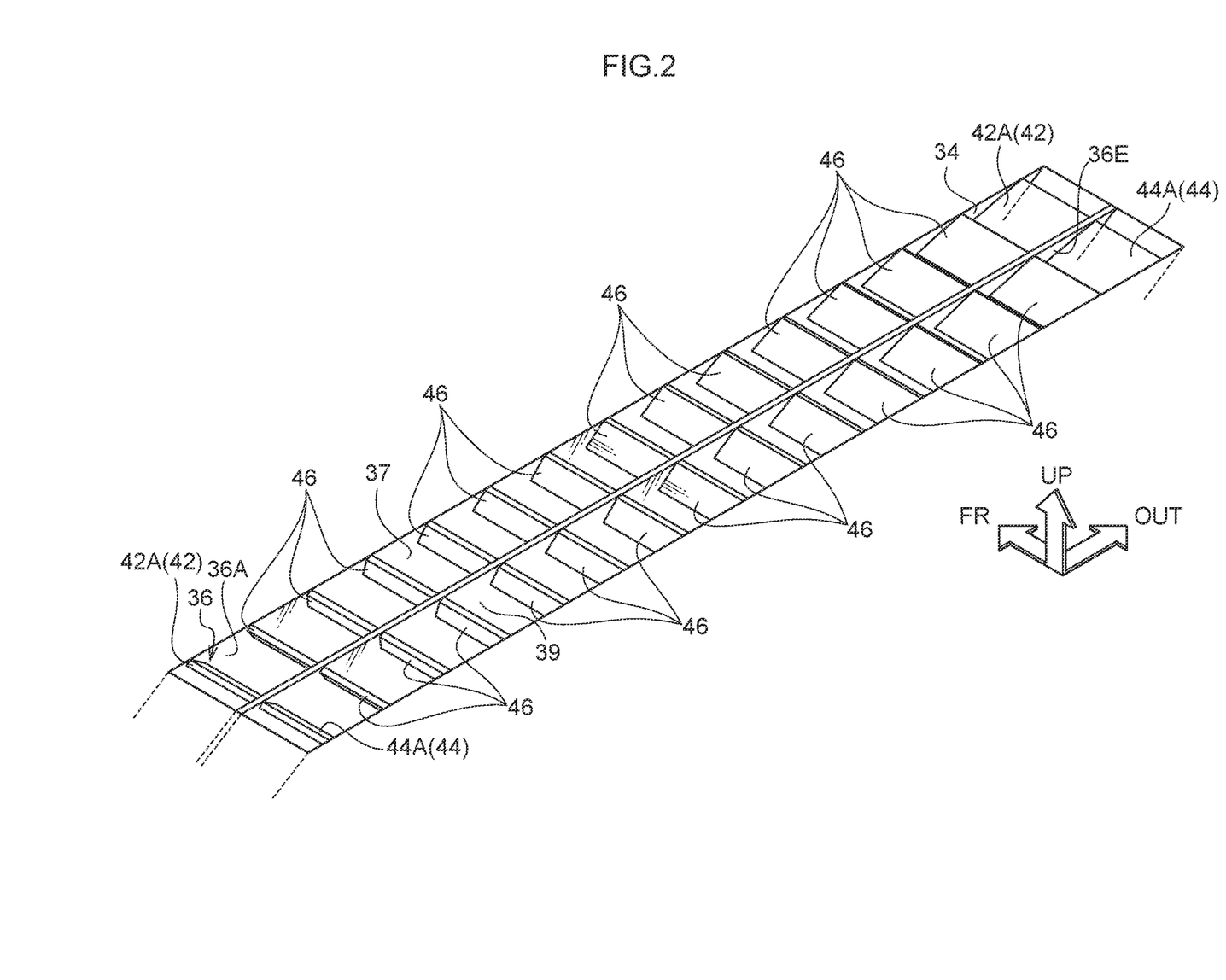
FIG. 2 is a schematic perspective view showing a state in which a garnish of a blow-out port is removed in the defroster structure relating to the first embodiment.
Figure 4:
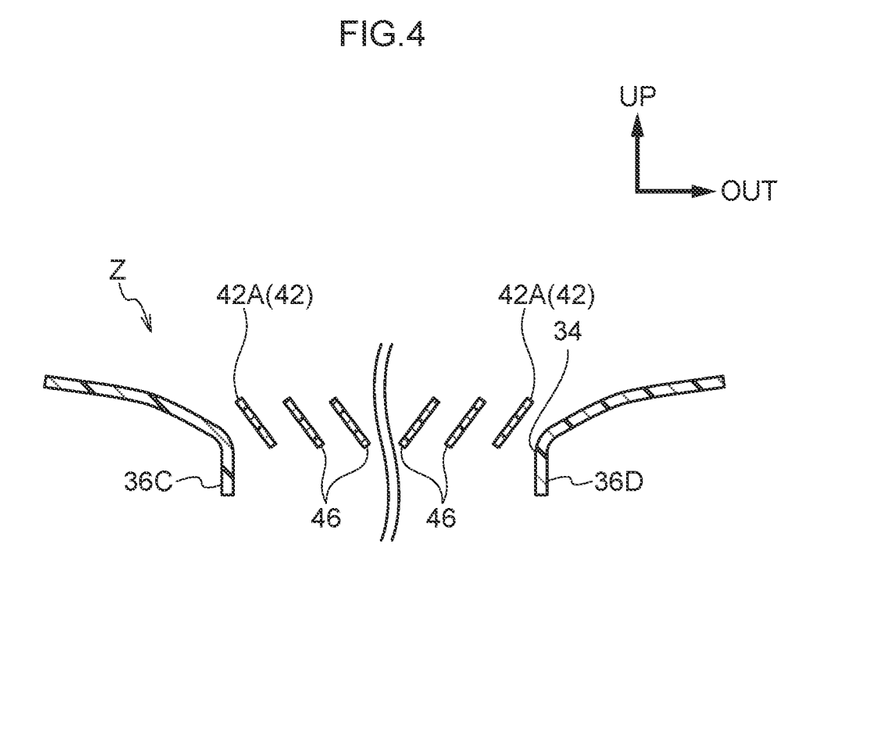
FIG. 4 is an enlarged sectional view that is cut along line B-B of FIG. 1 and shows a state in which the garnish is removed.

As shown in FIG. 2 and FIG. 4, a pair of left and right first guide members 42 is provided at the vehicle upper side of the interior of the blow-out port 34. The first guide members 42 are provided further toward the vehicle front side than the front-rear partitioning wall 36E at the interior of the blow-out port 34, and at the vehicle transverse direction outer sides of the interior of the blow-out port 34. As an example, the first guide members 42 are structured by one first guide fin 42A at the left and the right respectively.

The first guide fins 42A are structured by plate-shaped members whose length directions are the vehicle longitudinal direction and whose plate-thickness directions are the substantially vehicle transverse direction, and are inclined toward the vehicle transverse direction outer sides from the vehicle lower side toward the vehicle upper side. Further, the unillustrated front end portions in the vehicle longitudinal direction of the first guide fins 42A are connected (i.e., joined) to a front wall portion 36A of the duct 36, and the rear end portions are connected (i.e., joined) to the front-rear partitioning wall 36E.

(Second Guide Members)

Figure 5:
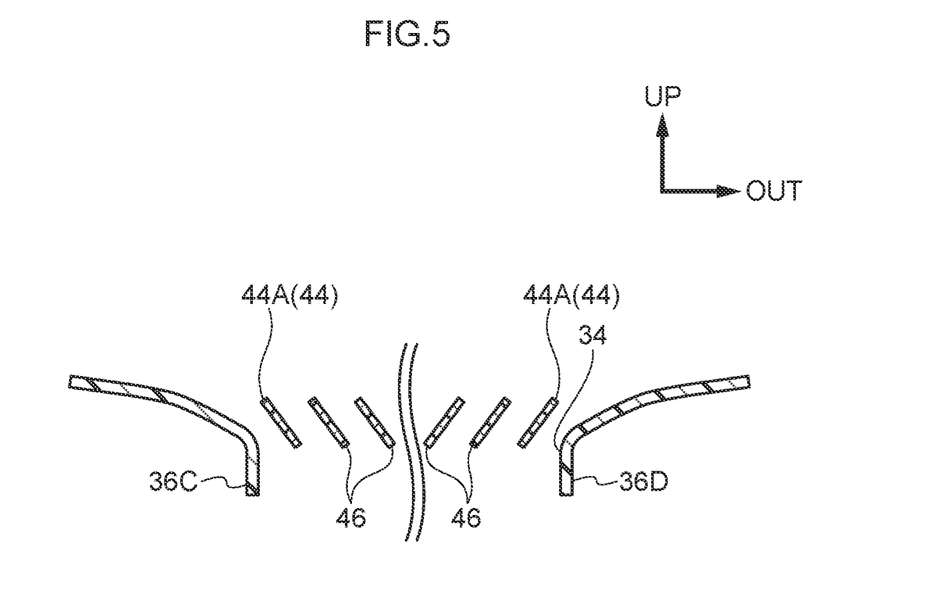
FIG. 5 is an enlarged sectional view that is cut along line C-C of FIG. 1 and shows a state in which the garnish is removed.

As shown in FIG. 2 and FIG. 5, a pair of left and right second guide members 44 is provided at the vehicle upper side of the interior of the blow-out port 34. The second guide members 44 are provided further toward the vehicle rear side than the front-rear partitioning wall 36E at the interior of the blow-out port 34, and at the vehicle transverse direction outer sides of the interior of the blow-out port 34 (see FIG. 2). As an example, the second guide members 44 are structured by one second guide fin 44A at the left and the right respectively.

In the same way as the above-described first guide fins 42A, the second guide fins 44A are structured by plate-shaped members whose length directions are the vehicle longitudinal direction and whose plate-thickness directions are the substantially vehicle transverse direction, and are inclined toward the vehicle transverse direction outer sides from the vehicle lower side toward the vehicle upper side. Further, the unillustrated front end portions in the vehicle longitudinal direction of the second guide fins 44A are connected (i.e., joined) to the front-rear partitioning wall 36E of the duct 36, and the rear end portions are connected (i.e., joined) to the rear wall portion 36B of the duct 36. As shown in FIG. 2, as seen in a vehicle front view, the angles of inclination of the second guide fins 44A with respect to the vertical direction are the same as those of the first guide fins 42A. Here, "the same" of course includes exactly the same, but also is used in the sense of including cases in which there is dispersion in terms of manufacturing and/or machining. The second guide fins 44A are disposed at the vehicle rear sides of the first guide fins 42A, with the front-rear partitioning wall 36E located therebetween. In other words, the first guide fin 42A and the second guide fin 44A are disposed continuously with the front-rear partitioning wall 36E therebetween.

A plurality of air direction adjusting fins 46 are provided between the pair of left and right second guide members 44. In the same way as the second guide fins 44A, the air direction adjusting fins 46 are structured by plate-shaped members whose length directions are the vehicle longitudinal direction and whose plate-thickness directions are the substantially vehicle transverse direction. The air direction adjusting fins 46 are inclined with the respective angles of inclination thereof, with respect to the vertical direction, being different than those of the second guide fins 44A of the second guide members 44. The angles of inclination of the air direction adjusting fins 46 are set by being adjusted appropriately per vehicle. As an example, in the first embodiment, the air direction adjusting fins 46 at the vehicle transverse direction center of the blow-out port 34 are substantially vertical, and the angles of inclination, with respect to the vertical direction, of the air direction adjusting fins 46 become greater the further toward the vehicle transverse direction outer sides. Similarly, the plurality of air direction adjusting fins 46, whose angles of inclination with respect to the vertical direction are set to respectively different angles, are provided also between the pair of left and right first guide members 42.

(Garnish)

Figure 6:
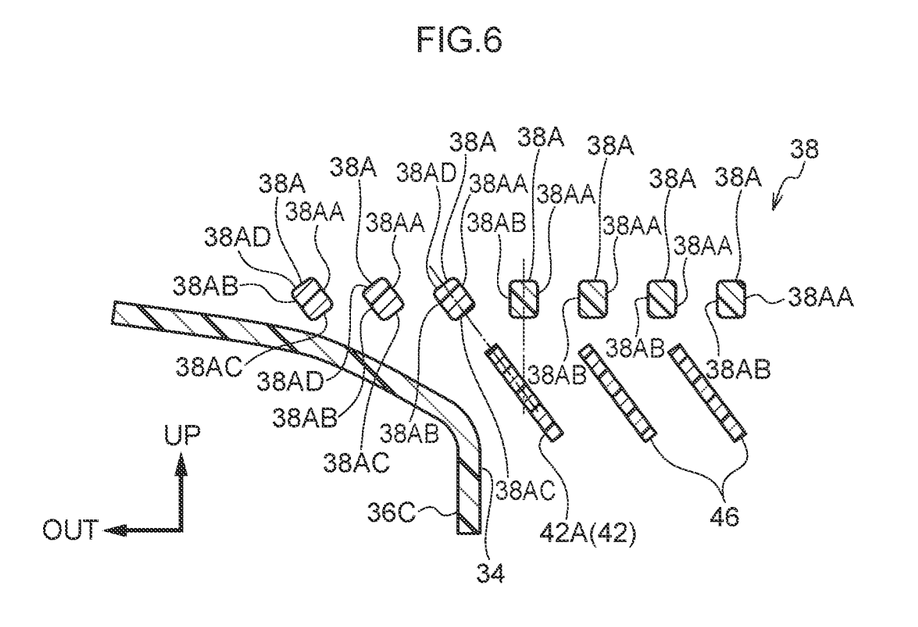
FIG. 6 is an enlarged sectional view in which portion Z in FIG. 4 is shown in an enlarged manner.

As shown in FIG. 1, the garnish 38 is formed substantially in the shape of a rectangular frame that has the plurality of crosspiece portions 38A that are disposed so as to be lined-up at a predetermined interval in the vehicle transverse direction. The crosspiece portions 38A are formed so as to be elongated in the vehicle longitudinal direction, and, as shown in FIG. 6, the cross-sectional shapes thereof orthogonal to the length directions are substantially rectangular. Further, the crosspiece portions 38A, which are positioned in vicinities of the first guide members 42 and the second guide members 44, i.e., at the vehicle transverse direction outer sides, are inclined at angles that are different than those of the crosspiece portions 38A at the other regions in the vehicle transverse direction (see FIG. 6). Concretely, the crosspiece portions 38A that are positioned at the vehicle transverse direction outer sides (e.g., three of the crosspiece portions 38A at each of the left side and the right side) are inclined such that the angles, with respect to the vertical direction, of long-side surfaces 38AA, 38AB, which correspond to the long sides as seen in cross-section, are substantially the same as the angles, with respect to the vertical direction, of the first guide fins 42A and the second guide fins 44A. Namely, short-side surfaces 38AC, 38AD, which correspond to the short sides as seen in cross-section, at the crosspiece portions 38A that are positioned at the vehicle transverse direction outer sides, are oriented orthogonally to the air-conditioned air that flows along the first guide fins 42A and the second guide fins 44A. Here, "the same" of course includes exactly the same, but also is used in the sense of including cases in which there is dispersion in terms of manufacturing and/or machining. Further, "substantially the same" also includes cases that are slightly offset from the aforementioned "the same". For example, "substantially the same" may also include cases in which the difference between the angles of the long-side surfaces 38AA, 38AB with respect to the vertical direction, and the angles of the first guide fins 42A and the second guide fins 44A with respect to the vertical direction, is within 5°. Further, the crosspiece portions 38A which are other than the crosspiece portions 38A that are positioned at the vehicle transverse direction outer sides (i.e., the crosspiece portions 38A that are at the central portion side in the vehicle transverse direction), are disposed such that the respective long-side surfaces 38AA, 38AB thereof are oriented parallel to the vertical direction.

(Operation/Effects of First Embodiment)

Operation and effects of the first embodiment are described next.

In the first embodiment, as shown in FIG. 1, the blow-out port 34 is formed at the substantially central portion in the vehicle transverse direction and at a position that substantially faces the windshield glass 18, of the instrument panel 16 that is positioned at the front portion of the passenger compartment 14. This blow-out port 34 blows out air-conditioned air that is from the air conditioner 40. Further, the front-rear partitioning wall 36E, the first guide members 42 and the second guide members 44 are provided at the interior of the blow-out port 34. Among these, the front-rear partitioning wall 36E is provided at the substantially central portion in the vehicle longitudinal direction at the interior of the blow-out port 34, and extends in the vehicle transverse direction. Accordingly, by the front-rear partitioning wall 36E, it is easy to adjust the flow of air-conditioned air that flows through the substantially central portion in the vehicle longitudinal direction of the blow-out port 34.

Further, as shown in FIG. 2, the first guide members 42 are respectively provided at the interior of the blow-out port 34, at further toward the vehicle front side than the front-rear partitioning wall 36E and at the vehicle transverse direction outer sides. On the other hand, the second guide members 44 are respectively provided at the interior of the blow-out port 34, at further toward the vehicle rear side than the front-rear partitioning wall 36E and at the vehicle transverse direction outer sides. The first guide members 42 and the second guide members 44 are respectively inclined toward the vehicle transverse direction outer sides while heading from the vehicle lower side toward the vehicle upper side, and the angles of inclination thereof with respect to the vertical direction are the same. Accordingly, the air-conditioned air whose flow is adjusted by the first guide member 42 of the blow-out port 34 and the air-conditioned air whose flow is adjusted by the second guide member 44 are blown out from the blow-out port 34 toward the vehicle transverse direction outer side in the same direction. Therefore, at the portion where the air-conditioned air whose flow is adjusted by the first guide member 42 and the air-conditioned air whose flow is adjusted by the second guide member 44 contact one another, friction loss that arises due to the blow-out directions being different can be suppressed. Namely, because pressure loss of the air-conditioned air is reduced, the air-conditioned air can be blown out efficiently toward vicinities of the vehicle transverse direction outer side portions of the windshield glass 18 that are at positions that are relatively far from the blow-out port 34. Due thereto, fog on the windshield glass 18 can be removed efficiently.

Moreover, at the passenger compartment side opening thereof, the blow-out port 34 has the plurality of crosspiece portions 38A. The plurality of crosspiece portions 38A are formed so as to be elongated in the vehicle longitudinal direction, and are lined-up substantially in the vehicle transverse direction. Accordingly, entry of foreign matter from the exterior into the interior of the blow-out port 34 can be suppressed. Further, as shown in FIG. 6, the cross-sectional shapes, orthogonal to the length directions, of the crosspiece portions 38A are substantially rectangular. Moreover, the crosspiece portions 38A, which are positioned in a vicinity of the first guide member 42 and the second guide member 44, are inclined such that, as seen in a vehicle front view, the angles, with respect to the vertical direction, of the long sides of the cross-sectional shapes thereof are substantially the same as the angles of inclination, with respect to the vertical direction, of the first guide member 42 and the second guide member 44 that are in the vicinity thereof. In other words, the crosspiece portions 38A, which are positioned in a vicinity of the first guide member 42 and the second guide member 44, are tilted such that, as seen in a vehicle front view, the long sides of the cross-sectional shapes thereof are substantially parallel to the directions of extension of the first guide member 42 and second guide member 44 that are in the vicinity thereof. Namely, the long sides of the cross-sectional shapes of the crosspiece portions 38A are substantially parallel to the direction of the flow of the air-conditioned air that is blown out along the first guide member 42 and the second guide member 44. Therefore, the crosspiece portions 38A impeding the flow of air-conditioned air can be suppressed. Due thereto, the efficient removal of fog on the windshield glass 18, and a suppression of foreign matter falling into the blow-out port 34, can both be realized.

Second Embodiment

A defroster structure relating to a second embodiment of the present disclosure is described next by using FIG. 7 and FIG. 8. Note that structural portions that are the same as those of the above-described first embodiment and the like are denoted by the same reference numerals, and description thereof is omitted.

The basic structure of the defroster structure relating to the second embodiment is similar to that of the first embodiment. However, the defroster structure relating to the second embodiment has the feature that left-right partitioning walls 60 are provided in addition to a front-rear partitioning wall 62 at the interior of the blow-out port 34.

(Left-Right Partitioning Walls)

Figure 7:
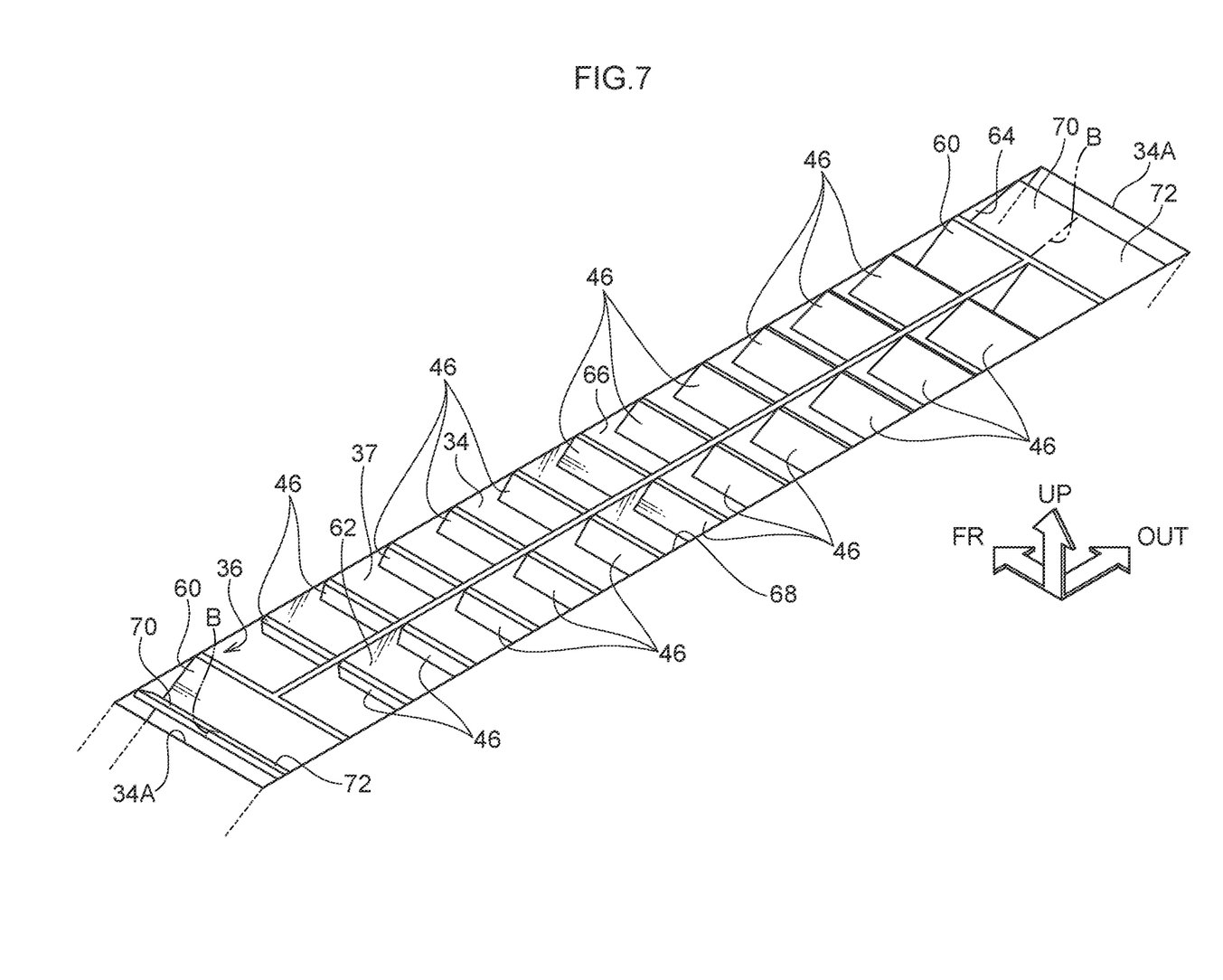
FIG. 7 is a schematic perspective view showing a state in which a garnish of a blow-out port is removed in a defroster structure relating to a second embodiment.
Figure 8:
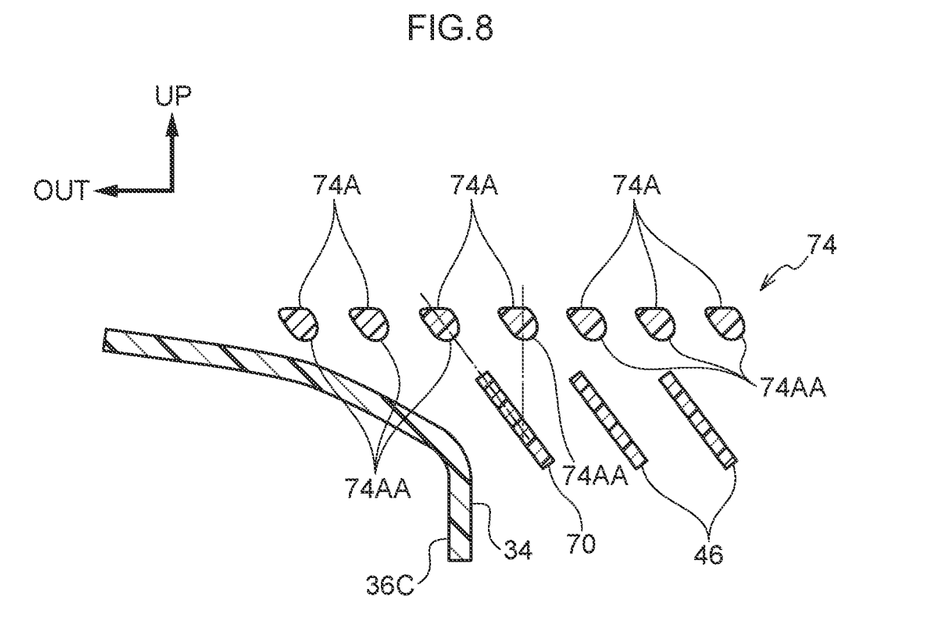
FIG. 8 is an enlarged sectional view, corresponding to FIG. 6, of the defroster structure relating to the second embodiment.

Namely, as shown in FIG. 7, the pair of left and right left-right partitioning walls 60 are provided at the vehicle transverse direction outer sides of the interior of the duct 36. The plate-thickness directions of the left-right partitioning walls 60 are the vehicle transverse direction, and the left-right partitioning walls 60 extend substantially along the vehicle longitudinal direction. Namely, the left-right partitioning walls 60 are structures that partition the duct 36 into a left portion and a right portion in the vehicle transverse direction. Unillustrated vehicle longitudinal direction end portions of the left-right partitioning walls 60 are connected (i.e., joined) to the front wall portion 36A and the rear wall portion 36B (see FIG. 3), respectively. The left-right partitioning walls 60 are disposed at the vehicle transverse direction inner sides of vehicle transverse direction outer side edge portions 34A of the blow-out port 34, respectively. Moreover, although not illustrated, as seen in a vehicle front view, the left-right partitioning walls 60 extend substantially parallel to the side wall portion 36C or the side wall portion 36D of the duct 36 (see FIG. 4 and FIG. 5).

(Front-Rear Partitioning Wall)

The front-rear partitioning wall 62 is provided at the substantially central portion in the vehicle longitudinal direction of the duct 36. The front-rear partitioning wall 62 extends along the vehicle transverse direction, with the plate thickness direction thereof being the substantially vehicle longitudinal direction. Namely, the front-rear partitioning wall 62 is a structure that partitions the duct 36 into a front portion and a rear portion in the vehicle longitudinal direction. The unillustrated vehicle transverse direction end portions of the front-rear partitioning wall 62 are connected (i.e., joined) to the left-right partitioning walls 60, respectively. As seen in a vehicle side view, the front-rear partitioning wall 62 is formed in a shape that is similar to the front wall portion 36A and the rear wall portion 36B. Namely, the front-rear partitioning wall 62 is formed in a shape in which the substantially central portion in the vehicle vertical direction is bent toward the vehicle front side as seen in a vehicle side view, and the front-rear partitioning wall 62 is disposed parallel to the front wall portion 36A and the rear wall portion 36B as seen in a vehicle side view. Due to the above-described structure, the front-rear partitioning wall 62 and the left-right partitioning walls 60 are formed integrally, and the shape thereof is a substantial H-shape as seen in a vehicle plan view. Therefore, there is a structure in which the interior of the duct 36 is divided into a pair of left and right side flow paths 64 at the vehicle transverse direction outer sides, and a front flow path 66 that is provided between the pair of side flow paths 64 and is disposed at the vehicle front side, and a rear flow path 68 that is provided between the pair of side flow paths 64 and is disposed at the vehicle rear side. In other words, this is a structure in which the front-rear partitioning wall 62 does not exist at the side flow paths 64.

(First Guide Members and Second Guide Members)

First guide members 70 and second guide members 72 that are provided as pairs at the left and the right are provided at the vehicle upper side of the interior of the blow-out port 34. In the second embodiment, as an example, regions, which are further toward the vehicle front side than imaginary line B shown by the two-dot chain line in FIG. 7, are the first guide members 70, and regions, which are further toward the vehicle rear side than the imaginary line B, are the second guide members 72. In other words, the second guide members 72 are provided further toward the vehicle rear side than the first guide members 70, and the second guide members 72 and the first guide members 70 are structured so as to be continuous. Further, the basic structures of the first guide members 70 and the second guide members 72 are similar to those of the first guide members 42 and the second guide members 44 of the first embodiment. The first guide members 70 and the second guide members 72 are provided respectively within the pair of left and right side flow paths 64 that are within the duct 36. Further, the first guide member 70 and the second guide member 72 are joined in the vehicle longitudinal direction. Note that the first guide member 70 and the second guide member 72 are structured by an integral member.

Note that the plurality of air direction adjusting fins 46 are provided respectively at the front flow path 66 and the rear flow path 68 that are between the pairs of left and right first guide members 70 and second guide members 72.

(Garnish)

In the same way as the garnish 38 of the first embodiment, a garnish 74 is formed in a substantially rectangular frame shape that has the plurality of crosspiece portions 74A that are disposed so as to be lined-up in the vehicle transverse direction at a predetermined interval (see FIG. 1). The crosspiece portions 74A are formed so as to be elongated in the vehicle longitudinal direction, and, as shown in FIG. 8, the cross-sectional shapes thereof, which are orthogonal to the length directions, are formed to be substantially rectangular. Further, curved portions 74AA are formed at the crosspiece portions 74A at the vehicle lower side regions thereof as seen in cross-section. For example, at the crosspiece portions 74A that are at the vehicle transverse direction outer sides, the curved portions 74AA are curved toward the vehicle transverse direction inner side. Although not illustrated, at the crosspiece portions 74A that are disposed at other than the vehicle transverse direction outer sides (i.e., that are disposed at the vehicle transverse direction central side), for example, the curved portions 74AA may be curved toward the vehicle transverse inner side, or may be curved toward the vehicle rear side.

(Operation/Effects of Second Embodiment)

Operation and effects of the second embodiment are described next.

In accordance with the above-described structure as well, effects that are similar to those of the first embodiment are achieved because the structure is similar to that of the defroster structure 10 of the first embodiment other than the point that the left-right partitioning walls 60 are provided at the interior of the blow-out port 34. Further, the pair of left and right left-right partitioning walls 60 is provided at the interior of the blow-out port 34. The left-right partitioning walls 60 are respectively provided at the vehicle transverse direction inner sides of the vehicle transverse direction outer side edge portions 34A of the blow-out port 34, and extend along the vehicle longitudinal direction between the vehicle longitudinal direction edge portions of the blow-out port 34 that face one another. The front-rear partitioning wall 62 is provided between the pair of left and right left-right partitioning walls 60. The vehicle transverse direction both end portions of the front-rear partitioning wall 62 are connected to the left-right partitioning walls 60, respectively. Further, the first guide members 70 and the second guide members 72 are disposed at the vehicle transverse direction outer sides of the left-right partitioning walls 60. Namely, there is a structure in which the front-rear partitioning wall 62 is not provided between the vehicle transverse direction outer side edge portions 34A of the blow-out port 34 and the left-right partitioning walls 60. Accordingly, it is possible to prevent an increase in pressure loss that is due to the air-conditioned air, which is blown out from between the vehicle transverse direction outer side edge portions 34A of the blow-out port 34 and the left-right partitioning walls 60, contacting the front-rear partitioning wall 62. Due thereto, fog on, in particular, the vehicle transverse direction outer side portions of the windshield glass 18 can be removed efficiently.

Moreover, at the passenger compartment side opening thereof, the blow-out port 34 has the plurality of crosspiece portions 74A. The plurality of crosspiece portions 74A are formed in shapes that are elongated in the vehicle longitudinal direction, and are lined-up substantially in the vehicle transverse direction. Accordingly, entry of foreign matter from the exterior into the interior of the blow-out port 34 can be suppressed. Further, the cross-sectional shapes, which are orthogonal to the length directions, of the crosspiece portions 74A are shapes in which at least the vehicle lower sides thereof have the curved portions 74AA. Accordingly, the air-conditioned air that is blown out along the first guide members 70 and the second guide members 72 flows along the curved portions 74AA, and therefore, the crosspiece portions 74A impeding the flow of air-conditioned air can be suppressed. Due thereto, the efficient removal of fog on the windshield glass 18, and a suppression of falling of foreign matter into the blow-out port, can both be realized.

Note that, although the second embodiment is structured such that the curved portions 74AA are provided at the vehicle lower sides of all of the crosspiece portions 74A of the garnish 74, the present disclosure is not limited to this. For example, there may be a structure in which the curved portions 74AA are provided only at the crosspiece portions 74A that are disposed in vicinities of the first guide members 70 and the second guide members 72. Further, although there is a structure in which the curved portions 74AA are provided at the vehicle lower sides of the crosspiece portions 74A, the present disclosure is not limited to this, and there may be a structure in which the curved portions 74AA are provided also at regions that are other than the vehicle lower sides of the crosspiece portions. Moreover, in the second embodiment, the left-right partitioning walls 60 are provided at both vehicle transverse direction outer sides (i.e., the left and right both sides), but the present disclosure is not limited to this, and may be a structure in which, for example, the left-right partitioning wall is provided at either one of the vehicle transverse direction outer sides.

Further, in the above-described first and second embodiments, there is a structure in which one of each of the first guide members 42, 70 and the second guide members 44, 72 is provided at each of the left and the right. However, the present disclosure is not limited to this. For example, there may be a structure in which one of the first guide members is provided and one of the second guide members is provided at either one of the vehicle transverse direction outer sides. Further, for example, there may be a structure in which a plurality of the first guide members 42, 70 and the second guide members 44, 72 are provided respectively at the left and the right at the vehicle transverse direction outer sides.

Moreover, although there is a structure in which the garnish 38, 74 is provided at the blow-out port 34, the present disclosure is not limited to this. For example, there may be a structure in which the garnish 38, 74 is not provided, and the falling of foreign matter into the blow-out port 34 is suppressed by the first guide members 42, 70, the second guide members 44, 72 and the air direction adjusting fins 46. Further, in the structure of the first embodiment, the plurality of crosspiece portions 74A may be provided instead of the plurality of crosspiece portions 38A. Moreover, in the structure of the second embodiment, the plurality of crosspiece portions 38A may be provided instead of the plurality of crosspiece portions 74A.

Although embodiments of the present disclosure have been described above, the present disclosure is not limited to the above, and, of course, may be implemented by being modified in various ways other than the above, within a scope that does not depart from the gist thereof.

Note that the disclosure of Japanese Patent Application No. 2019-217327 filed on Nov. 29, 2019 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A defroster structure comprising:
    a blow-out port that is provided at a position that substantially faces a windshield glass of a vehicle, at a substantially central portion in a vehicle transverse direction of an instrument panel positioned at a front portion of a passenger compartment of the vehicle, and that blows out air-conditioned air that is from an air conditioner;
    a front-rear partitioning wall that is provided at an interior of the blow-out port, that extends in the vehicle transverse direction, and that partitions at least a portion of the interior of the blow-out port in a vehicle longitudinal direction;
    a first guide member that is provided further toward a vehicle front side than the front-rear partitioning wall, at a vehicle transverse direction outer side at the interior of the blow-out port, and that is inclined toward the vehicle transverse direction outer side while heading from a vehicle lower side toward a vehicle upper side,
    a second guide member that is provided further toward a vehicle rear side than the front-rear partitioning wall, at the vehicle transverse direction outer side at the interior of the blow-out port, that is inclined toward the vehicle transverse direction outer side while heading from the vehicle lower side toward the vehicle upper side, and that has an angle of inclination with respect to a vertical direction which is the same as that of the first guide member;
    a duct configured to be connected to the air conditioner, the front-rear partitioning wall being provided in a substantially central portion of the duct in the vehicle longitudinal direction;
    a garnish having a plurality of crosspiece portions being mounted from the vehicle upper side to the blow-out port; and
    a left-right partitioning wall is provided at the interior of the blow-out port,
    wherein:
    the plurality of crosspiece portions, which are formed so as to be elongated along substantially the vehicle longitudinal direction and are lined up at an interval in substantially the vehicle transverse direction, are provided at the vehicle upper side to the blow-out port;
    cross-sectional shapes, which are orthogonal to the vehicle transverse direction, of the crosspiece portions are substantially rectangular;
    the plurality of crosspiece portions includes a first crosspiece portion that is positioned in a vicinity of the first guide member and the second guide member is inclined such that, as seen in a vehicle front view, an angle, with respect to a vertical direction, of a long side of the cross-sectional shape is substantially the same as angles of inclination, with respect to the vertical direction, of the first guide member and the second guide member that are in the vicinity;
    the left-right partitioning wall is provided at a vehicle transverse direction inner side with respect to a vehicle transverse direction outer side edge portion of the blow-out port, and extends along the vehicle longitudinal direction between vehicle longitudinal direction edge portions of the blow-out port;
    the front-rear partitioning wall is provided at a vehicle transverse direction inner side of the left-right partitioning wall, and a vehicle transverse direction end portion of the front-rear partitioning wall is connected to the left-right partitioning wall; and
    the first guide member and the second guide member are disposed at a vehicle transverse direction outer side with respect to the left-right partitioning wall.

2. The defroster structure of claim 1, wherein the second guide member is provided further toward the vehicle rear side than the first guide member.

3. The defroster structure of claim 2, wherein the second guide member is provided further toward the vehicle rear side than the first guide member, with the front-rear partitioning wall located between the second guide member and the first guide member.

4. The defroster structure of claim 2, wherein the second guide member is joined to the first guide member in the vehicle longitudinal direction.

5. A defroster structure comprising:
- a blow-out port that is provided at a position that substantially faces a windshield glass of a vehicle, at a substantially central portion in a vehicle transverse direction of an instrument panel positioned at a front portion of a passenger compartment of the vehicle, and that blows out air-conditioned air that is from an air conditioner;
- a front-rear partitioning wall that is provided at an interior of the blow-out port, that extends in the vehicle transverse direction, and that partitions at least a portion of the interior of the blow-out port in a vehicle longitudinal direction;
- a pair of left-right partitioning walls are provided at the interior of the blow-out port;
- first guide members that are provided further toward the vehicle front side than the front-rear partitioning wall, at both respective vehicle transverse direction outer sides of the interior of the blow-out port and that are inclined toward their respective vehicle transverse direction outer side while heading from a vehicle lower side toward a vehicle upper side;
- second guide members that are provided further toward the vehicle rear side than the front-rear partitioning wall, at both respective vehicle transverse direction outer sides of the interior of the blow-out port, that are inclined toward their respective vehicle transverse direction outer side while heading from the vehicle lower side toward the vehicle upper side, and that have an angle of inclination with respect to a vertical direction which is the same as that of the respective first guide member;
- a duct configured to be connected to the air conditioner, the front-rear partitioning wall being provided in a substantially central portion of the duct in the vehicle longitudinal direction; and
- a garnish having a plurality of crosspiece portions being mounted from the vehicle upper side to the blow-out port;

wherein:
- the plurality of crosspiece portions, which are formed so as to be elongated along substantially the vehicle longitudinal direction and are lined up at an interval in substantially the vehicle transverse direction, are provided at the vehicle upper side to the blow-out port;
- cross-sectional shapes, which are orthogonal to the vehicle transverse direction, of the crosspiece portions are substantially rectangular;
- the plurality of crosspiece portions includes a respective first crosspiece portion that is positioned in a vicinity of the first guide members and the second guide members and that is inclined such that, as seen in a vehicle front view, an angle, with respect to a vertical direction, of a long side of the cross-sectional shape is substantially the same as angles of inclination, with respect to the vertical direction, of the first guide member and the second guide member that are in the respective vicinity;
- the front-rear partitioning wall is provided between the pair of left-right partitioning walls, and both respective vehicle transverse direction end portions of the front-rear partitioning wall are connected to the left-right partitioning walls;
- the first guide members and the second guide members are disposed at vehicle transverse direction outer sides with respect to the left-right partitioning walls; and
- the pair of the left-right partitioning walls are provided at vehicle transverse direction inner sides with respect to a pair of vehicle transverse direction outer side edge portions of the blow-out port, and extend along the vehicle longitudinal direction between a pair of vehicle longitudinal direction edge portions of the blow-out port.

\* \* \* \* \*